US009018564B2

(12) United States Patent
Sargent et al.

(10) Patent No.: US 9,018,564 B2
(45) Date of Patent: Apr. 28, 2015

(54) MECHANICAL ATTACHMENT OF ELECTRICAL TERMINALS TO PLASTIC GLAZINGS

(75) Inventors: Jonathan Sargent, Toronto (CA); Eric van der Meulen, Wixom, MI (US); Robert A. Schwenke, Austin, TX (US); Jason Beaudoin, Livonia, MI (US); Juan Velasquez, Clarkston, MI (US)

(73) Assignee: Exatec LLC, Wixom, MI (US)

( * ) Notice: Subject to any disclaimer, the term of this patent is extended or adjusted under 35 U.S.C. 154(b) by 1358 days.

(21) Appl. No.: 12/111,182

(22) Filed: Apr. 28, 2008

(65) Prior Publication Data

US 2008/0268672 A1 Oct. 30, 2008

Related U.S. Application Data

(60) Provisional application No. 60/914,187, filed on Apr. 26, 2007.

(51) Int. Cl.

*B60L 1/02* (2006.01)
*H01R 12/57* (2011.01)
*H05B 3/84* (2006.01)
*B60J 1/00* (2006.01)

(52) U.S. Cl.

CPC .................. *H01R 12/57* (2013.01); *H05B 3/84* (2013.01); *H05B 2203/016* (2013.01)

(58) Field of Classification Search

USPC ................. 219/203, 522, 541, 547; 296/84.1; 439/78

See application file for complete search history.

(56) References Cited

U.S. PATENT DOCUMENTS

| | | | | |
|---|---|---|---|---|
| 3,798,419 A | | 3/1974 | Maake | |
| 4,100,398 A | | 7/1978 | Levin | |
| 4,246,467 A | | 1/1981 | Boaz | |
| 4,396,826 A | * | 8/1983 | Orcutt et al. | 219/522 |
| 4,815,198 A | * | 3/1989 | Ramus | 29/611 |
| 4,883,940 A | * | 11/1989 | Tokarz | 219/203 |
| 4,997,396 A | * | 3/1991 | Gold et al. | 439/801 |
| 5,760,744 A | * | 6/1998 | Sauer | 343/700 MS |
| 5,897,406 A | | 4/1999 | Benes et al. | |
| 2006/0234523 A1 | | 10/2006 | Baranski et al. | |

FOREIGN PATENT DOCUMENTS

| | | |
|---|---|---|
| DE | 100 16 346 A1 | 10/2000 |
| EP | 0 634 882 | 1/1995 |
| GB | 1 333 049 | 10/1973 |

OTHER PUBLICATIONS

International Search Report—PCT/US2008/061826—mailed Aug. 20, 2008.

* cited by examiner

*Primary Examiner* — Shawntina Fuqua
(74) *Attorney, Agent, or Firm* — Cantor Colburn LLP

(57) ABSTRACT

A plastic window system including a transparent plastic panel and an electrically conductive grid provided on the plastic panel. The conductive grid includes at least one conductive mounting location. An electrical terminal is electrically connected to the conductive mounting location, and a connector secures the terminal to the conductive mounting location. The connector includes a portion extending from the panel to a location outboard of the conductive mounting location relative to the panel.

24 Claims, 5 Drawing Sheets

MECHANICAL ATTACHMENT OF ELECTRICAL TERMINALS TO PLASTIC GLAZINGS

CROSS REFERENCE TO RELATED APPLICATION

This invention claims the benefit of U.S. provisional application No. 60/914,187, filed Apr. 26, 2007, the entire contents of which are herein incorporated by reference.

BACKGROUND OF THE INVENTION

1. Field of the Invention

The present invention generally relates to the connection of electrical terminals to plastic panels having electrically conductive grids thereon. More specifically, the present invention relates to the attachment of electrical terminals to an electrical circuit applied to a plastic substrate in a plastic window system in order to provide such things as defrosting and defogging capabilities to the window system.

2. Description of the Related Technology

Electrically heatable grids have long been used for the defrosting and defogging of windows, particularly backlights of automobiles. Various types of electrically heated windows have been devised and typically include an electrically conductive heating grid located toward either the interior or exterior side of the window. The heating grid typically includes a pair of opposed busbars, between which a series of grid lines extend. During the passing of electric current through the heating grid, the resistance of the grid lines results in the generation of heat. This heat dissipates across the window, subsequently defrosting or defogging of the window. In order to provide electricity to the heating grid, the heating grid is coupled to the electrical system of the automotive vehicle.

To achieve this coupling of the automotive vehicle's electrical system to the heating grid, the busbars of the heating grid have been provided with foil tabs that extend beyond the edges of the window. Terminals of a wire harness terminal, from the vehicle's electrical system, engage the tabs. The terminals are of a variety of constructions, but often include a spring metal contact, encased within a housing. When the housing is attached to a tab, the contact is biased against and into contact with the busbar.

In an alternate construction, bonding pads are integrally formed with the busbars and the terminals from the vehicle's electrical system are soldered directly to the bonding pads.

Each of the above constructions has its known problems and limitations. Illustrative of the limitations of the spring contacts, over the life of the vehicle, the spring contacts may become loose due to fatigue and/or vibration, resulting in a non-working or a poorly working heating grid. With regard to the limitations of a pad bonding construction, the application of too much or too little solder weakens the joint between the terminals and the bonding pad, which may result in the terminal being easily dislodged from the bonding pad itself. Due to the low glass transition temperature of plastics, traditional high temperature solder cannot be used to make robust connections to the busbars 18, 19. The soldering temperatures of such solders are too high and result in damage to the plastic of the panel 14, the coatings, or inks thereon. Unfortunately, the commercially available low temperature solders, and even, electrically conductive adhesives, have unacceptable bonding strengths and or reliability. Connecting with such materials results in the terminals being bonded to the busbar and requiring minimal force, i.e. only 5 or 6 pounds of force (push/pull), applied parallel to the surface of the panel, to remove the terminal. Typically, original equipment manufacturers (OEM) require the connection to withstand forces of significantly greater forces before removal, such as around 30 pounds of force.

In view of the above, it is apparent that improved connection constructions for attaching terminals to the busbars of heating grids, or other electrofunctional materials on plastic window systems are required.

SUMMARY

In overcoming the drawbacks and limitations of the known technology, the present invention provides a plastic window system including a transparent plastic panel and an electrically conductive grid provided on the plastic panel. The conductive grid includes at least one conductive mounting location and an electrical terminal is electrically connected to this mounting location. Securing the terminal to the mounting location is a connector. The connector including a portion extending from the panel to a location outboard, relative to the panel, of the mounting location.

In another aspect of the present invention, the conductive grid is one of an antenna, an electroluminescent border, a heating grid and chromogenic devices, such as electrochromic devices, photochromic devices, liquid crystal devices, user-controllable-photochromic devices, polymer-dispersed-liquid-crystal devices, and suspended particle devices commonly known in the art.

In a further aspect of the invention, the connector is a compressive edge clip, the edge clip including one end received within the panel and an opposing end biasing the terminal into engagement with the conductive mounting location.

In an additional aspect of the invention, the opposing end of the edge clip compresses the terminal between the opposing end of the edge clip and the conductive mounting location.

An additional aspect of the invention includes the edge clip being retained on the panel by a bonding agent.

In another aspect of the invention the bonding agent is located between the one end of edge clip and the panel.

In a further aspect of the invention the opposing end of the edge clip is received within a bore defined in an edge of the panel.

In another aspect of the invention the connector is threaded and the terminal is retained in engagement with the connector by a nut threadably received on the connector.

In an additional aspect of the invention, the connector completely extends through the thickness of the panel In a further aspect of the invention, the connector extends less than completely through the thickness of the panel.

In another aspect of the invention the connector is conductive.

In a further aspect of the invention the connector includes an internally threaded insert secured to the panel and a bolt threadably engaged therewith.

In an additional aspect of the invention the connector is mounted to the surface of the panel and includes a post extending through the conductive mounting location outward from the panel, the terminal being received on the post.

In another aspect of the invention the connector is non-conductive.

In a further aspect of the invention the connector includes a compression nut received on the post, the compression nut biases the terminal into engagement with the conductive mounting location.

In an additional aspect of the invention the connector is conductive.

In another aspect of the invention the post is threaded.

In a further aspect of the invention the terminal is received within a bore defined within a side edge of the panel.

In a further aspect of the invention the connector extends into the panel laterally relative to the bore defined in the side edge and the terminal.

In an additional aspect of the invention the conductive grid is a heater grid integrally formed with the plastic panel, the heater grid having a plurality of grid lines formed of a conductive material, whereby the plurality of grid lines heat via resistive heating when an electrical current from a power supply travels through each of the plurality of grid line FIG. 2 is a partial cross sectional view of one embodiment of the inventions.

DETAILED DESCRIPTION

Figure 1:
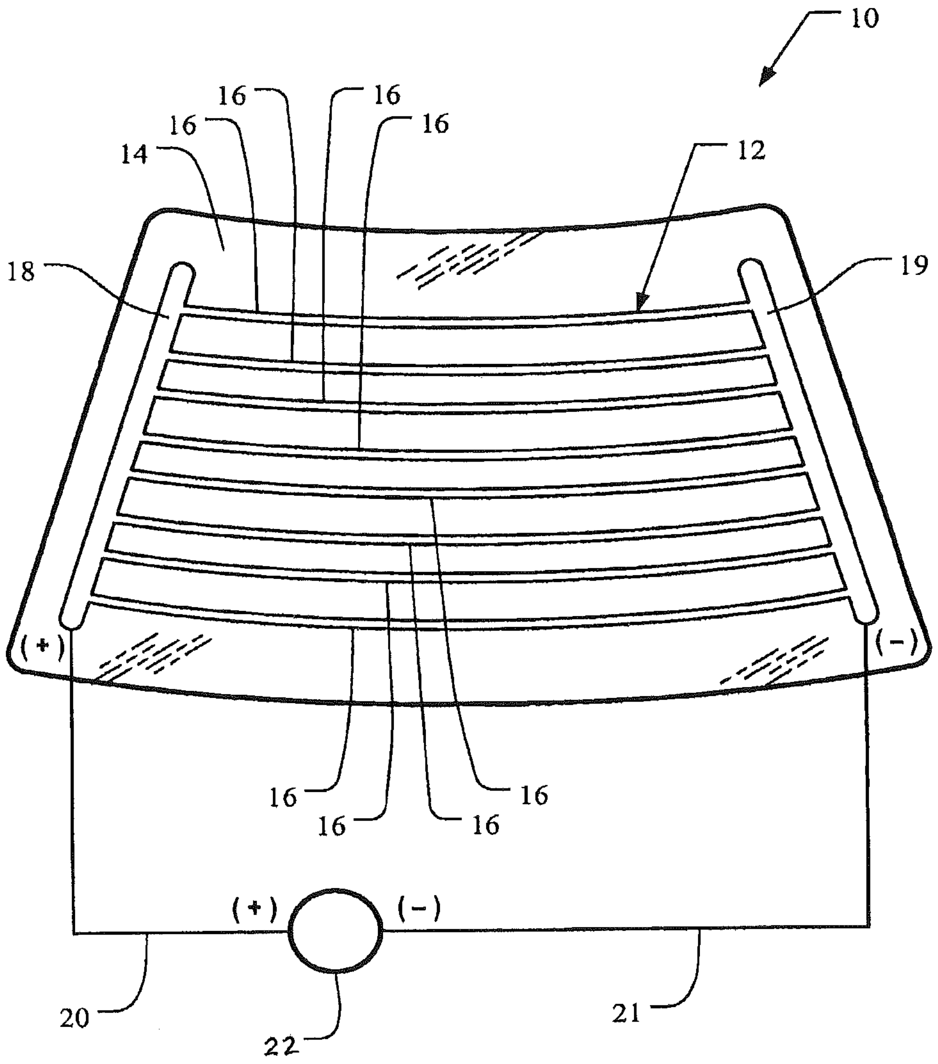
FIG. 1 is a schematic view of a window assembly embodying the principles of the present invention.

Referring now to FIG. 1, a plastic window system 10 is generally illustrated therein and includes, as its primary components, an electrically conductive heating grid 12 provided on a panel 14.

The panel 14 is a transparent plastic panel, preferably made of a thermoplastic resin over which one or more weathering and abrasion resistant layers are applied. The weathering and abrasion resistant layers may be applied over the heating grid 12 or applied to the panel 14 prior to application of the heating grid 12.

The panel 14 itself may be formed through the use of any technique known to those skilled in the art, such as molding, which includes injection molding, blow molding, and compression molding and/or thermoforming, the latter including thermal forming, vacuum forming, and cold forming. Although not necessary, the aforementioned techniques may be used in combination with each other, such as thermoforming a first layer of the panel into the shape of a surface of the mold prior to injection molding of another layer onto and integrally bonding with the first layer, thereby, forming a multilayered panel 14 of the desired shape.

The panel 14 may be formed from a variety of plastic resins, including but not limited to, polycarbonate, acrylic, polyarylate, polyester and polysulfone resins, as well as copolymers and mixtures thereof, as well as being copolymerized or blended with other polymers such as PBT, ABS, or polyethylene. The panel 14 may further be comprised of various additives, such as colorants, mold release agents, antioxidants, and ultraviolet absorbers (UVA), among others.

The weathering layer preferably comprises either a polyurethane coating or a combination of an acrylic primer and a silicone hard-coat. Alternatively, other coating systems may be used.

In one preferred embodiment, the primer in the weathering layer is a waterborne acrylic primer comprising water as a first co-solvent and an organic liquid as a second co-solvent. The primer may contain additives, such as, but not limited to, surfactants, antioxidants, biocides, ultraviolet absorbers (UVAs), and drying agents, among others. One example of such an acrylic primer is Exatec® SHP 9X, (Exatec, LLC, Wixom, Mich.).

By way of example, the resin in the silicone hard-coat is preferably a methylsilsesquioxane resin dispersed in a mixture of alcohol solvents. The silicone hard-coat may also comprise other additives, such as but not limited to surfactants, antioxidants, biocides, ultraviolet absorbers, and drying agents, among others. A preferred silicone hard-coat is Exatec® SHX (Exatec, LLC, Wixom, Mich.).

The weathering layer may be applied to the transparent plastic panel by dipping the panel in the coating at room temperature and atmospheric pressure through a process known to those skilled in the art as dip coating. Alternatively, the weathering layer may be applied by flow coating, curtain coating, spray coating, or other processes known to those skilled in the art.

A substantially inorganic coating that adds additional or enhanced functionality to the automotive decorative glazing assembly, such as improved abrasion resistance, is applied on top of the weathering layer. Specific examples of possible inorganic coatings comprising the abrasion resistant layer include, but are not limited to, aluminium oxide, barium fluoride, boron nitride, hafnium oxide, lanthanum fluoride, magnesium fluoride, magnesium oxide, scandium oxide, silicon monoxide, silicon dioxide, silicon nitride, silicon oxy-nitride, silicon oxy-carbide, silicon carbide, hydrogenated silicon oxy-carbide, tantalum oxide, titanium oxide, tin oxide, indium tin oxide, yttrium oxide, zinc oxide, zinc selenide, zinc sulfide, zirconium oxide, zirconium titanate, or glass, and mixtures or blends thereof.

The abrasion resistant layer may be applied by any technique known to those skilled in the art. These techniques include deposition from reactive species, such as those employed in vacuum-assisted deposition processes, and atmospheric coating processes, such as those used to apply sol-gel coatings to substrates. Examples of vacuum-assisted deposition processes include, but not limited to, plasma enhanced chemical vapor deposition (PECVD), arc-PECVD, ion assisted plasma deposition, magnetron sputtering, electron beam evaporation, and ion beam sputtering. Examples of atmospheric coating processes include, but are not limited to, curtain coating, spray coating, spin coating, dip coating, and flow coating.

The heating grid 12 preferably includes a series of grid lines 16 extending between generally opposed busbars 18, 19, although other constructions of heating grids may be employed. The grid lines 16 may of equal or differing widths or thicknesses. Furthermore, at least some of the grid lines 16 may be replaced by a conductive film or coating extending between the remaining grid lines 16.

The busbars 18, 19 are designated as positive and negative busbars and are respectively connected to positive and negative leads 20, 21 of a power supply 22. The power supply 22 may be the electrical system of an automotive vehicle. Upon the application of a voltage to the heating grid 12, electric current will flow through the grid lines 16 from the positive busbar 18 to the negative busbar 19 and, as a result, the grid lines 16 will heat up via resistive heating. The widths and lengths of the bus bars 18, 19 and grid lines 16 may be of any suitable dimension and will, in part, be determined by the size and other characteristics of the window system 10.

In applying the heating grid 12 to the panel 14, the heating grid 12 may be applied by any of the methods known now or in the future to those skilled in the art. Such methods include, without limitation, printing the heating grid 12 on the panel 14.

Various mechanical systems are provided herein to connect a terminal to the bus bar or terminal pad of an electrical circuit.

Figure 2:
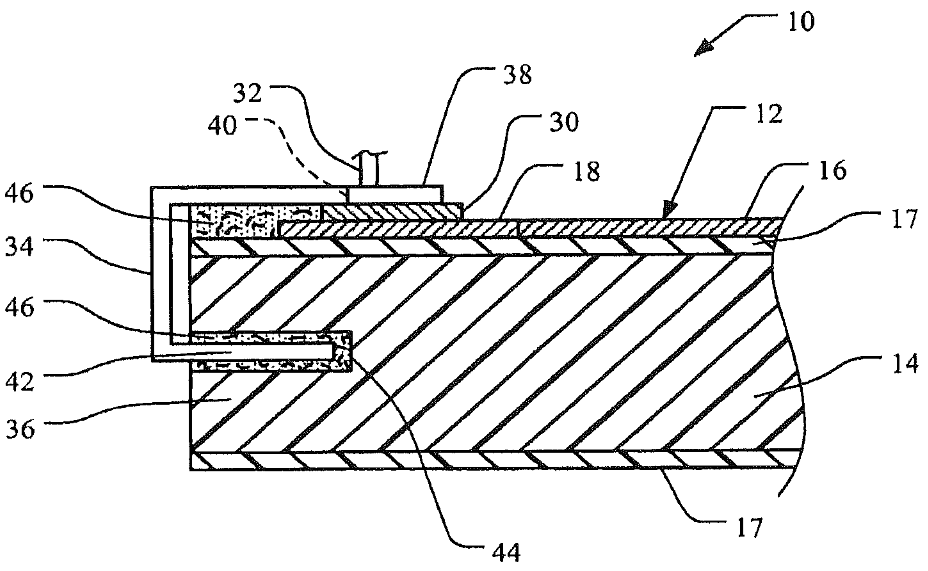
FIG. 2 is a partial cross sectional view of one embodiment of the invention.

In a first embodiment of the invention, as seen in FIG. 2, the heating grid 12 (busbars 18, 19 and grid lines 16) is applied to the panel 14 over top one or both of the weathering and abrasion resistant layers, generically designated as 17. For the sake of clarity, only one busbar 18 of the pair of busbars 18, 19 is further illustrated, it being understood that this connection, and those that follow, is applicable to both of the busbars 18, 19 of the heating grid 12, as well as a conductive mounting location for an alternative electrical function, such as an antenna, an electroluminescent border, an electrical switch. A terminal 30, and connected wire 32, are provided on and in electrical contact with the busbar 18. To secure the terminal 30 to the busbar 18, a compressive edge clip 34 is provided over an end or edge 36 of the panel 14. The edge clip 34 is preferably made of spring steel and biases the terminal 30 into engagement with the busbar 18. Alternatively the edge clip 34 may be made of any material, including plastic, that will enable the edge clip 34 to provide the necessary biasing force. One end, a terminal end 38, of the edge clip 34 overlies the terminal 30 and secures the terminal 30 to the busbar 18. A slot or bore 40 may be provided in the end 38 so as to allow the wire 32 to pass through the end 38 of the clip 34. The opposing end 42 of the edge clip 34 is preferably inserted into a bore or hole 44 provided in the edge 36 of the panel 14. This bore 44 may be molded into the edge 36 during forming of the panel 14 or may be drilled into the edge 42 during a post molding operation. While the edge clip 34 may in and of itself exhibit a sufficient biasing force so as to retain the contact 30 on the busbar 18, it is preferred that the edge clip 34 is bonded to the panel 14 using a bonding agent 46, such as an epoxy or other adhesive. The bonding agent 46 is preferably located between the edge clip 34 and the side of the panel 14 on which the heating grid 12 is located. Additionally, the adhesive is also provided in the bore 44 so as to retain the other end 42 of the edge clip 34 therein.

Figure 3:
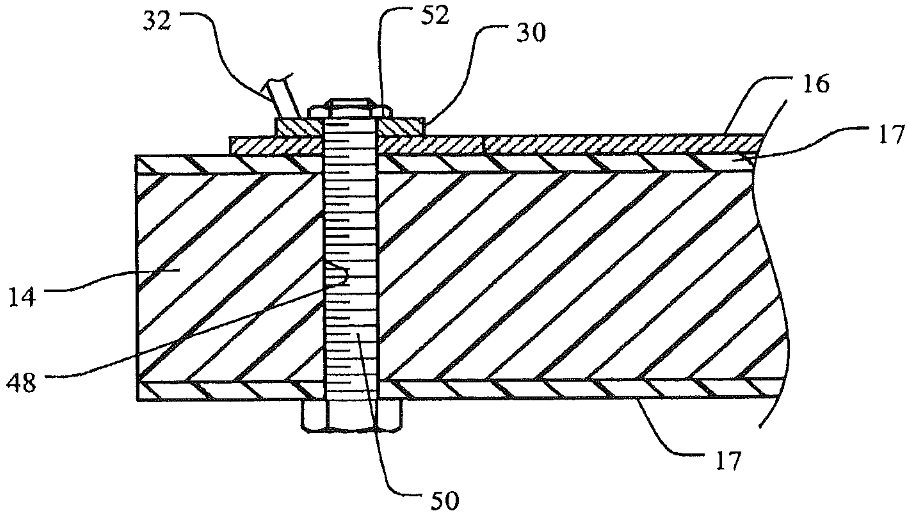
FIG. 3 is a partial cross sectional view of another embodiment of the invention.

A second embodiment of the invention is illustrated in FIG. 3. As in the prior embodiment, the heating grid 12 is applied to the panel 14 over top one or both of the weathering and abrasion resistant layers, again generically designated as 17. In order to secure the terminal 30 and wire to the heating grid 14, this embodiment provides for the drilling of a bore 48 through the width of the panel 14, including through the busbar 18 itself. The terminal 30 is provided on top of the busbar 18 and a threaded bolt 50 extended through the bore 48 and through an opening in the terminal 30. As such the terminal 30 is preferably a ring-type terminal, although a forked terminal could also be used. A nut 52 is threadably engaged onto the bolt 50 so as to retain the terminal 30 between the nut 52 and the busbar 18. To eliminate visual objections to the terminal 30, nut 52 and end of the bolt 50, a cap (not shown) may be used over the end of the bolt 50 and nut 52. Since the terminal 30 is in direct contact with the busbar 18, the bolt 50 does not have to be constructed of a conductive material.

Figure 4:
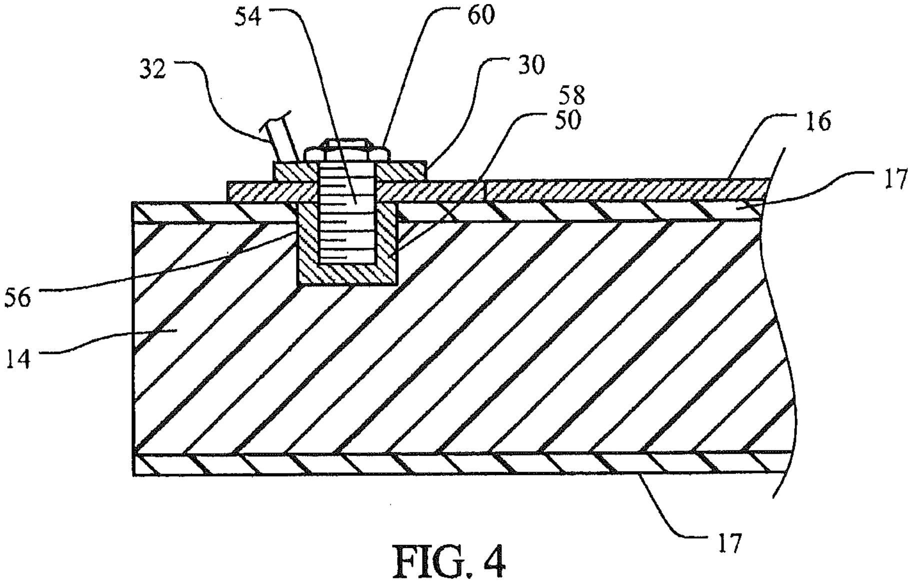
FIG. 4 is a partial cross sectional view of further embodiment of the invention.

A fourth embodiment is illustrated in FIG. 4. In this embodiment, a threaded shaft 54 is embedded into one side of the panel 14. In order to embed the shaft into the panel 14, a bore 56 is provided, either molded during forming of the panel 14 or drilled post production of the panel 14, in one side of the panel 14. The shaft 54 is then inserted into the bore 56 and retained via an insert 58 provided in the bore 56 and either molded in place or retained by bonding agent, such as an epoxy or other adhesive. Like the embodiment of FIG. 3, the terminal 30 is provided on top of the busbar 18, with the end of the shaft 54 extending through an opening or slot in the terminal 30. Again, the terminal 30 in such an instance is preferably a ring-type terminal, although a forked terminal could also be used. Onto the shaft 54, a nut 60 is threadably engaged so as to retain the terminal 30 between the nut 60 and the busbar 18. For aesthetic reasons, the terminal 30, nut 60 and end of the shaft 54 may be covered by a cap (not shown). Since the terminal 30 is in direct contact with the busbar 18, the shaft 54 does not have to be constructed of a conductive material.

Figure 5:
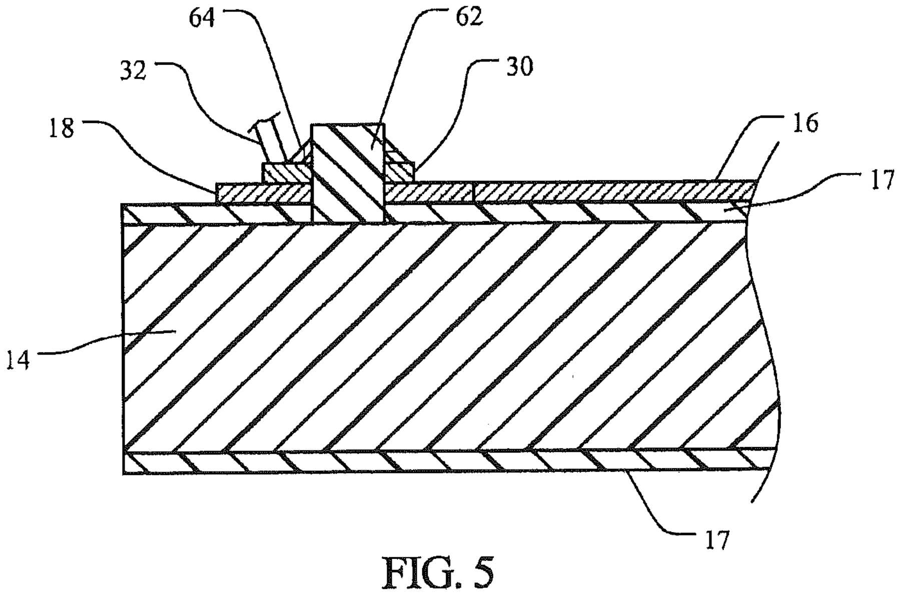
FIG. 5 is a partial cross sectional view of an additional embodiment of the invention.

A further embodiment of the invention is illustrated in FIG. 5. In this embodiment, a non-threaded post 62 is secured to the surface of the panel 14 before application of the weathering and abrasion resistant layers 17. To secure the post 62, bonding agents, such as epoxy or other adhesives may be used. The terminal 30 is provided on top of the busbar 18, with the end of the post 60 extending through an opening or slot in the terminal 30. As with the prior embodiments, the terminal 30 is preferably a ring or fork-type terminal. A compression nut 64 is provided over the end of the post 62 and forces the terminal down into electrical connection with the busbar 18. Again, since the terminal 30 is in direct contact with the busbar 18, the post does not need to be made of an electrically conductive material.

Figure 6:
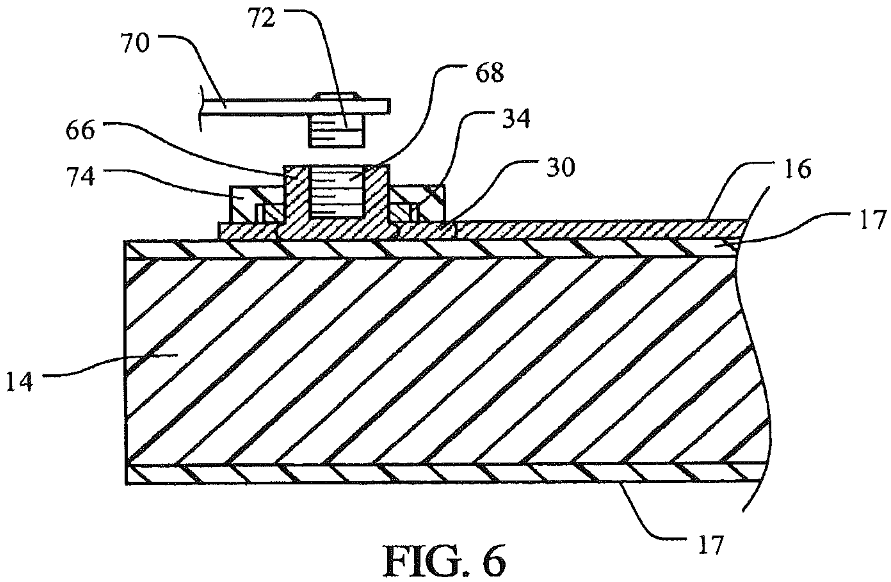
FIG. 6 is a partial cross sectional view of one embodiment of the invention.

As shown in FIG. 6, an additional embodiment of the invention includes providing boss 66 on top of the weathering and abrasion resistant layers 17. The boss 66 is provided with internal threads 68 and the busbar 18 provided about and in electrical contact with the boss 66. The terminal 70 is of a different construction than that seen in the other embodiments and includes an integrally formed threaded bolt 72. The bolt 72 engages with the boss 66, which is formed of a electrically conductive material, such that the electrical connection of the terminal 70 with the busbar 18 is made via the boss 66 and bolt 72. If desired a cap 74 may be provided over portions of the attachment constructions for enhanced aesthetics.

Figure 7:
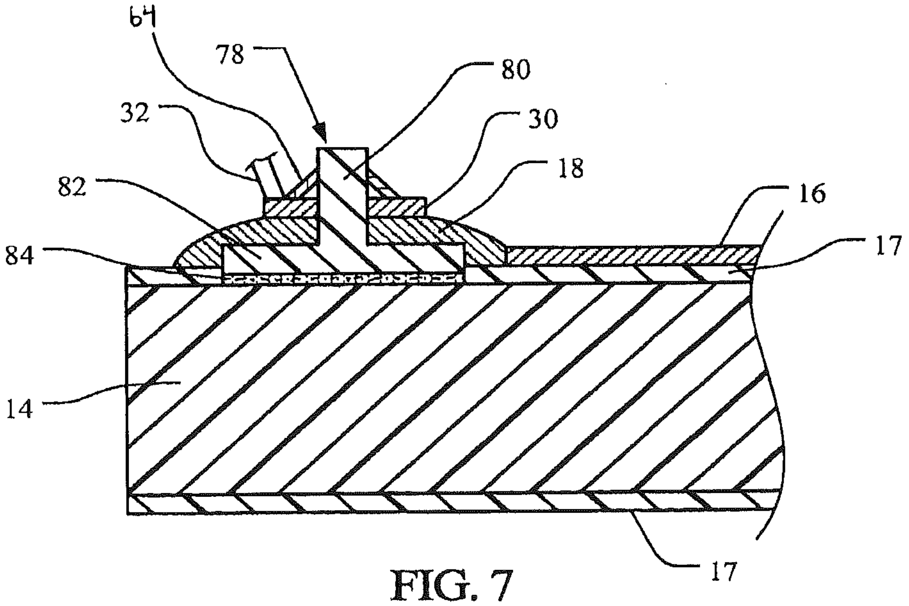
FIG. 7 is a partial cross sectional view of another embodiment of the invention.
Figure 8:
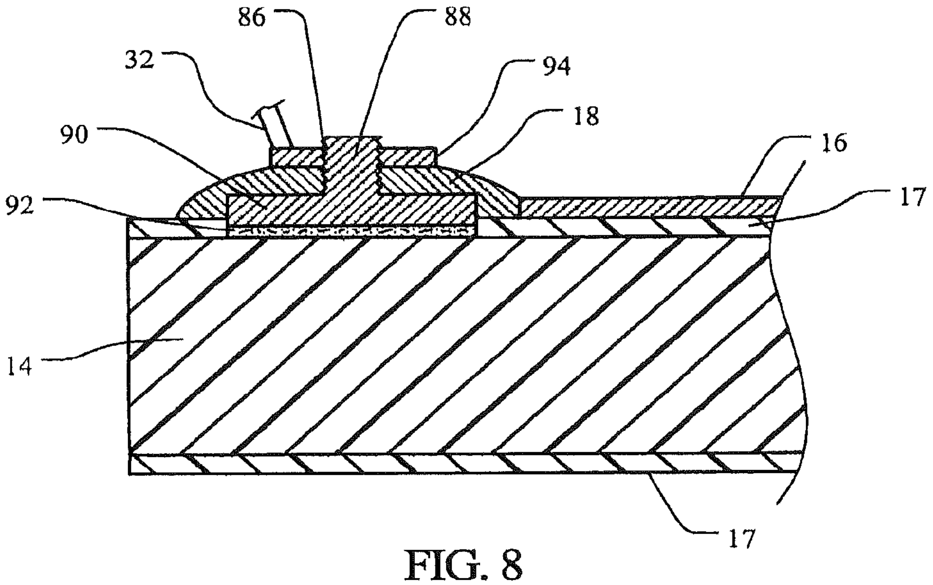
FIG. 8 is a partial cross sectional view of a further embodiment of the invention.

Two additional embodiments are illustrated in FIGS. 7 and 8. In each of these embodiments, connector is mounted to the panel 14 prior to the application of the weathering and abrasion resistant layers 17 and the busbar 18 is printed over top of a portion of the connector.

In FIG. 7, the connector 78 is constructed of a non-electrically conductive material and includes a cylindrical post 80 extending from an enlarged, generally flat base 82; the base 82 being secured to the panel 14 with a bonding agent 84. Provided over the post and in contact with the busbar 18 is the terminal 30. A compression nut 64 is engaged with the post 80 so as to force and maintain the terminal 30 in contact with the busbar 18.

In FIG. 8, the connector 86 is constructed of an electrically conductive material and also includes a threaded post 88 extending from an enlarged, generally flat base 90; the base 90 being secured to the panel 14 with a bonding agent 92. The terminal 94 is provided over the post 88 in direct contact with the busbar 18. The terminal 94 itself may be provided with threads so as to engage directly with the post 88 or, alternatively the terminal 94 may be retained with a threaded nut (not shown) engaged with the post, as generally described in various ones of the prior embodiments.

Figure 9:
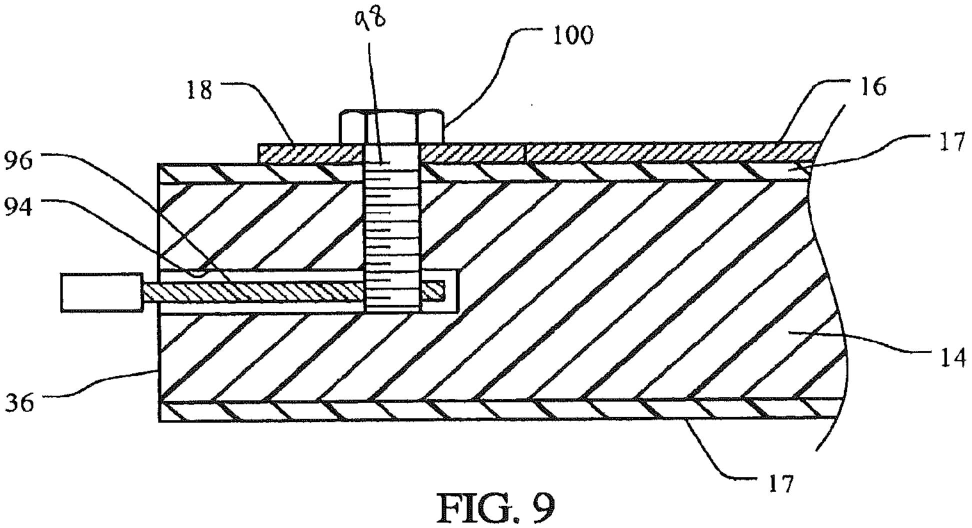
FIG. 9 is a partial cross sectional view of an additional embodiment of the invention.

The final illustrated embodiment of the invention is shown in FIG. 9. In this embodiment, a bore 94 is formed into the side edge 36 of the panel 14. Into this bore 94 is extended the terminal 96. A second bore 98, transverse to the edge bore 94, is also provided in the panel 14 and is located so as to pass through the busbar 18 and to intersect with the edge bore 94. A screw or bolt 100 is extended through the transverse bore 98 such that it engages and retains the terminal 96. The bolt 100 may pass through an opening in the end of the terminal 96 or it may compressively engage the end of the terminal 96 between end of the bolt 100 and the sidewall of the edge bore 94. In that the bolt 100 is formed of a conductive material, the terminal will be electrically connected to the bus bar 18 and the heating grid 12.

The preceding description of the preferred embodiment is merely exemplary in nature and is in no way intended to limit the invention or its application or uses. A person skilled in the art will recognize from the previous description that modifications and changes can be made to the preferred embodiment of the invention without departing from the scope of the invention as defined in the following claims.

What is claimed is:

1. A plastic window system comprising:

a transparent plastic panel;

an electrically conductive grid on the transparent plastic panel;

an electrical terminal electrically connected to the electrically conductive grid; and a connector, the connector securing the electrical terminal to the electrically conductive grid, the connector including a portion extending from the transparent plastic panel to a location outboard of the electrically conductive grid relative to the transparent plastic panel, wherein the connector is an edge clip, the edge clip being one piece and including one end received within the panel and an opposing end biasing the terminal into engagement with the electrically conductive grid.

2. The plastic window system of claim 1 wherein the conductive grid is one of an antenna, an electroluminescent border, an electrical switch, a heating grid and chromogenic devices.

3. The plastic window system of claim 1 wherein the opposing end of the edge clip compresses the terminal between the opposing end of the edge clip and the electrically conductive grid.

4. The plastic window system of claim 1 wherein the edge clip is further retained on the panel by a bonding agent.

5. The plastic window system of claim 1 wherein the opposing one end of the edge clip is received within a bore defi ned laterally in an edge of the panel.

6. The plastic window system of claim 4 wherein the bonding agent is located between the end of edge clip and the panel.

7. A plastic window system comprising:

a transparent plastic panel having a first side and a second side;

an electrically conductive grid, wherein the electrically conductive grid comprises a first bus bar and a grid line, wherein the first bus bar comprises a first bus bar side and a second bus bar side, wherein the second bus bar side is located on the first side of the transparent plastic panel;

an electrical terminal electrically connected to the electrically conductive grid, wherein the electrical terminal comprises a first terminal side and a second terminal side, wherein the second terminal side is located on and is in direct contact with the first bus bar side; and a connector, the connector securing the second terminal side of the electrical terminal to the first bus bar side of the bus bar of the electrically conductive grid, wherein the connector is threaded and extends from the first side of the transparent plastic panel into a bore and at least partially into the panel, the terminal being retained in engagement with the connector by a nut or bolt threadably engaging the connector; and wherein one or both of a weathering layer and an abrasion resistant layer is optionally located in between the electrically conductive grid and the transparent plastic panel; and wherein one or both of a second weathering layer and a second abrasion resistant layer is optionally located on the second side of the transparent plastic panel.

8. The plastic window system of claim 7 wherein the connector completely extends through the thickness of the panel.

9. The plastic window system of claim 7 wherein the connector is conductive.

10. The plastic window system of claim 7, wherein the connector extends only partially into the panel; and wherein the connector is retained in the bore via an internally threaded insert.

11. The plastic window system of claim 7, wherein the connector is retained in the bore via a bonding agent.

12. A plastic window system comprising:

a transparent plastic panel having a first side and a second side;

an electrically conductive grid, wherein the electrically conductive grid comprises a first bus bar and a grid line, wherein the first bus bar comprises a first bus bar side and a second bus bar side, wherein the second bus bar side is located on the first side of the transparent plastic panel;

an electrical terminal electrically connected to the electrically conductive grid, wherein the electrical terminal comprises a first terminal side and a second terminal side;

a connector, the connector securing the electrical terminal to the electrically conductive grid;

wherein the connector includes an internally threaded conductive insert comprising a first insert side and a second insert side, wherein the conductive insert is secured to the panel such that the second insert side is located on the first side of the transparent plastic panel, and wherein the connector includes a bolt threadably engaged with the internally threaded insert, and wherein the second terminal side is located on and is in direct contact with the first insert side; and wherein one or both of a weathering layer and an abrasion resistant layer is optionally located in between the electrically conductive grid and the transparent plastic panel; and wherein one or both of a second weathering layer and a second abrasion resistant layer is optionally located on the second side of the transparent plastic panel.

13. A plastic window system comprising:

a transparent plastic panel having a first side and a second side;

an electrically conductive grid, wherein the electrically conductive grid comprises a first bus bar and a grid line, wherein the first bus bar comprises a first bus bar side and a second bus bar side, wherein the second bus bar side is located on the first side of the transparent plastic panel;

an electrical terminal electrically connected to the electrically conductive grid, wherein the electrical terminal comprises a first terminal side and a second terminal side, wherein the second terminal side is located on and is in direct contact with the first bus bar side; and a connector, the connector securing the electrical terminal to the electrically conductive grid, wherein the connector comprises a post and a base comprising a first base side and a second base side, wherein a portion of the electrically conductive grid overlays at least a portion of the base and is located on the first base side, wherein the second base side is located on the first side of the transparent plastic panel, wherein a bonding agent is optionally located in between the second base side and the first side of the transparent plastic panel, wherein a compression nut is optionally located on the post; and wherein one or both of a weathering layer and an abrasion resistant layer is optionally located in between the electrically conductive grid and the transparent plastic panel; and wherein one or both of a second weathering layer and a second abrasion resistant layer is optionally located on the second side of the transparent plastic panel.

14. The plastic window system of claim 13 wherein the connector is non conductive.

15. The plastic window system of claim 13 further comprising a compression nut received on the post, wherein the compression nut biases the terminal into engagement with the electrically conductive grid.

16. The plastic window system of claim 13 wherein the post is threaded.

17. The plastic window system of claim 13 wherein an outer perimeter of the base is larger than an outer perimeter of the post.

18. A plastic window system comprising:

a transparent plastic panel;

an electrically conductive grid on the transparent plastic panel;

an electrical terminal electrically connected to the electrically conductive grid; and a connector, the connector securing the electrical terminal to the electrically conductive grid, the connector including a portion extending from the transparent plastic panel to a location outboard of the electrically conductive grid relative to the transparent plastic panel, wherein the terminal is received within a bore defined laterally within a side edge of the panel.

19. The plastic window system of claim 18 wherein the connector extends into the panel laterally relative to the bore defi ned in the side edge and the terminal.

20. The plastic window system of claim 12 wherein a layer is disposed in between the panel and the electrically conductive grid, wherein the layer is at least one of a weathering layer and an abrasion resistant layer.

21. A method of making a plastic window system comprising:

applying an electrically conductive grid to a transparent plastic panel;

mounting a connector that electrically connects an electrical terminal to the electrically conductive grid;

applying a layer to the transparent plastic panel, wherein the layer comprises at least one of a weathering layer and an abrasion resistant layer;

wherein mounting the connector occurs prior to the application of the layer.

22. The method of claim 21, wherein applying the electrically conductive grid occurs after applying the layer.

23. A plastic window system comprising:

a transparent plastic panel having a first side and a second side;

an electrically conductive grid, wherein the electrically conductive grid comprises a first bus bar and a grid line, wherein the first bus bar comprises a first bus bar side and a second bus bar side, wherein the second bus bar side is located on the first side of the transparent plastic panel;

an electrical terminal electrically connected to the electrically conductive grid, wherein the electrical terminal comprises a first terminal side and a second terminal side, wherein the second terminal side is located on and is in direct contact with the first bus bar side; and a connector comprising a non-threaded post and a compression nut, the connector securing the electrical terminal to the electrically conductive grid;

a layer between the transparent plastic panel and the electrically conductive grid, wherein the layer is at least one of a weathering layer and an abrasion resistant layer;

wherein the connector extends into the layer; and wherein one or both of a second weathering layer and a second abrasion resistant layer is optionally located on the second side of the transparent plastic panel.

24. The plastic window system of claim 23, wherein the connector extends through the layer.

* * * * *